J. J. SHAULES & B. J. MILLER.
SAW VISE.
APPLICATION FILED JAN. 24, 1913.
1,084,824.
Patented Jan. 20, 1914.
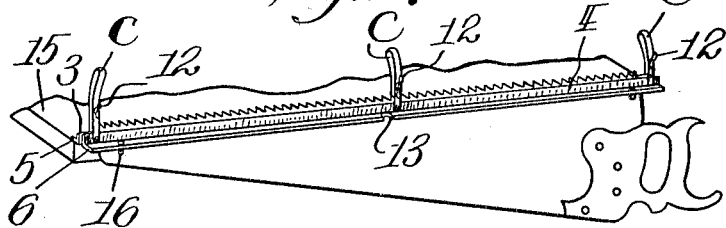
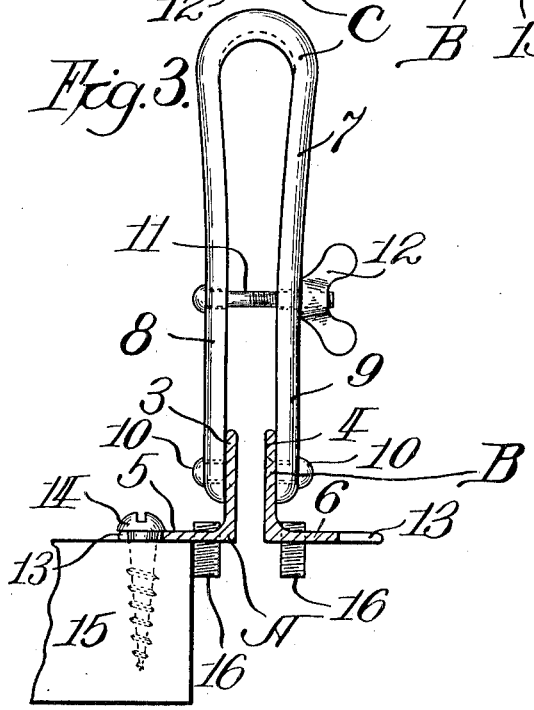
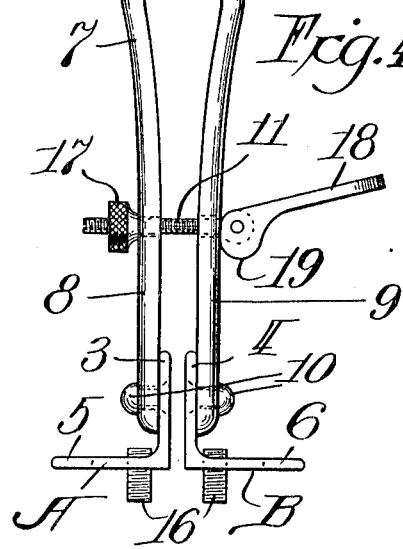
Witnesses:
S. L. Waschenberger
H. L. Fischer
Inventors: John J. Shaules,
Benjamin J. Miller,
by J. Bradbury
Attorney.

UNITED STATES PATENT OFFICE.

JOHN J. SHAULES AND BENJAMIN J. MILLER, OF ST. PAUL, MINNESOTA.

SAW-VISE.

1,084,824.

Specification of Letters Patent.

Patented Jan. 20, 1914.

Application filed January 24, 1913. Serial No. 743,981.

*To all whom it may concern:*

Be it known that we, JOHN J. SHAULES and BENJAMIN J. MILLER, respectively citizens of Canada and the United States, residing at St. Paul, in the county of Ramsey and State of Minnesota, have invented new and useful Improvements in Saw-Vises, of which the following is a specification.

Our invention relates to improvements in vises for holding saws while their teeth are being filed and set.

The object is to produce a vise of this class, which is capable of holding the saw blade firmly, and which is strong and durable in construction and efficient and effective in operation.

A further object is to provide a saw vise which is inexpensive in construction, and which can be operated in such manner as to enable the operator filing and setting the teeth of a saw without changing the position of its blade in the vise.

To these ends our invention consists of the features of construction and combination of parts which will be hereinafter described and claimed, all of which will be fully understood by reference to the accompanying drawings, in which is illustrated an embodiment of our invention.

In the accompanying drawings, Figure 1 is a perspective view showing our invention in use, Fig. 2 is a top view of the same, Fig. 3 is an enlarged end view, and Fig. 4 is another end view showing a modification of our invention.

In the drawings, A and B represent a pair of parallel angle bars having two of their sides 3 and 4 extending upwardly in substantially parallel vertical planes, and the remaining two sides 5 and 6 lying in a substantially horizontal plane. The vertical sides of the angle bars are adapted to be clamped upon a saw blade by means of the spring clamping members C, which are disposed above the angle bars. Each of these clamping members is in the form of a spring loop 7, made of metal or other suitable material having two opposite side arms 8 and 9, lying adjacent each other, the tendency of which is to spread apart. The ends of these side arms are pivotally jointed to the vertical sides of the angle bars by means of pivots 10, which allow the clamping member to swing longitudinally of the angle bars. A bolt 11 is passed freely through the side arms of the loops and by tightening the thumb nut 12 on said bolt, the side arms may be drawn together, thus clamping the angle bars upon the saw blade, which is placed between the vertical sides 3 and 4 of said bars. The bolt 11 is positioned a sufficient distance above the pivot members so that the teeth of the saw blade may project above the sides 3 and 4 of the angle bars and so that the clamping member may be swung in either direction longitudinally of the angle bars permitting ready access to the teeth of the blade for filing and setting purposes. The horizontal sides 5 and 6 of the angle bars are formed with notches 13, in their edges midway between the ends of the bars to receive a screw such as 14 for clamping either side of the angle bars to a support such as is indicated by 15. The horizontal sides of the angle bars are also provided with stop pins 16, which are disposed near the opposite ends of each bar, these pins being adapted to impinge against the support 15 as illustrated in Fig. 3, and co-acting with the screw fastening means 14, to hold the device vertically and horizontally upon the support with either side of the saw blade facing the operator.

In Fig. 4 the screw 11 securing the sides of the loop 7 is adapted to hold said sides at a predetermined distance apart before the angle bars are clamped upon the saw blade by means of the thumb nut 17. A cam lever 18 is pivotally secured upon the head end of the bolt 11 with its cam surface 19 adapted to impinge against one of the sides of the loop, so that when the lever is turned down its cam surface draws the sides of the loop together automatically, thus easily and quickly clamping the angle bars upon the saw blade or when the lever is swung out into the position illustrated in Fig. 4, releasing the saw blade from the angle bars.

In accordance with the patent statutes we have described the principles of operation of our invention together with the apparatus which we now consider to represent the best embodiment thereof but we desire to have it understood that the construction shown is only illustrative and that the invention can be carried out by other means and applied to uses other than those above set forth within the scope of the following claims.

Having described our invention, what we claim as new and desire to protect by Letters Patent is:—

1. A saw vise, comprising, a pair of jaw members consisting of a pair of angle bars having a pair of their sides arranged adjacent each other, and extending upwardly above the remaining sides, a spring loop having a pair of sides pivotally secured by their ends to said vertical sides of said angle bars, and permitting said loops to swing longitudinally in either direction, and means for drawing the sides of said loop toward each other to clamp said angle bars upon the surface of an object.

2. A saw vise, comprising, a pair of jaw members consisting of angle bars having two sides facing each other, and the remaining two sides lying horizontally, means for securing said horizontal sides to a supporting object, means adapted to impinge against said supporting object and carried by said horizontal sides to prevent lateral play of said angle bars, a plurality of clamping loops having their sides pivotally secured to the vertical sides of said angle bars, said loops being adapted to swing longitudinally and to spring apart and spread said jaw members and means co-acting with the sides of said loops adapted to clamp said jaw members upon an object.

3. A saw vise, comprising, in combination, a pair of jaw members consisting of angle bars disposed in parallel relation with a pair of side faces lying adjacent each other in upright position, a plurality of clamping members each having a pair of sides movably disposed to permit said jaws opening and closing, the lower ends of the sides of said clamping members being pivotally secured to said jaw members and adapted to swing longitudinally thereof and means for contracting each of said clamping members and clamping said jaw members upon an object.

4. A saw vise, comprising, in combination, a pair of jaw members having two inner faces lying in contiguous upright position and disposed in parallel relation, a spring loop having a pair of ends pivotally secured to said members, said loops being adapted to swing longitudinally and to spring apart and spread said jaw members, means co-acting with the sides of said loops adapted to clamp said jaw members upon an object, means for securing one of said jaw members to a support, and stops disposed near and extending downwardly from said notched member and adapted to impinge against a side of said support to prevent longitudinal swinging movement of said member on its fastening means.

In testimony whereof, we have signed our names to this specification, in the presence of two subscribing witnesses.

JOHN J. SHAULES.
BENJAMIN J. MILLER.

Witnesses:
    MARTIN H. ALBIN,
    F. G. BRADBURY.

Copies of this patent may be obtained for five cents each, by addressing the "Commissioner of Patents, Washington, D. C."